United States Patent [19]

Hulsey

[11] Patent Number: 5,107,560

[45] Date of Patent: Apr. 28, 1992

[54] KNIFE TOOL

[76] Inventor: Michael K. Hulsey, 1050 Villa Rica Hwy., Dallas, Ga. 30132

[21] Appl. No.: 680,565

[22] Filed: Apr. 4, 1991

[51] Int. Cl.⁵ .............................................. B25F 1/04
[52] U.S. Cl. ........................................ 7/163; 7/100; 7/164; 33/562
[58] Field of Search ................... 7/100, 163, 168, 164, 7/158; 33/562; 30/142, 143, 152, 155

[56] References Cited

U.S. PATENT DOCUMENTS

| | | |
|---|---|---|
| 63,102 | 3/1867 | Russ . |
| 177,696 | 5/1876 | Davis . |
| 596,096 | 12/1897 | Watts . |
| 673,153 | 4/1901 | Baseler . |
| 696,995 | 4/1902 | Moser . |
| 987,703 | 3/1911 | Curtin . |
| 1,015,026 | 1/1912 | Jackson et al. .......................... 7/168 |
| 1,204,676 | 11/1916 | Machuga . |
| 1,441,948 | 1/1923 | Schrag . |
| 1,485,347 | 2/1924 | Jacobs . |
| 1,486,190 | 3/1924 | Lopez . |
| 1,828,121 | 10/1931 | Adam et al. . |
| 1,875,784 | 9/1932 | Walker .................................. 33/562 |
| 2,184,340 | 12/1939 | Ferlin . |
| 2,197,668 | 4/1940 | Starr ...................................... 33/562 |
| 2,498,171 | 2/1950 | Michler ................................. 33/562 |
| 2,564,812 | 11/1951 | McGuire . |
| 2,579,386 | 12/1951 | Koenig .................................. 33/562 |
| 4,856,132 | 8/1989 | Burns et al. . |

FOREIGN PATENT DOCUMENTS 162875  5/1921  United Kingdom .

Primary Examiner—Roscoe V. Parker
Attorney, Agent, or Firm—B. J. Powell

[57] ABSTRACT

A knife tool comprising a handle pivotally mounting a cutting blade and an elongate feeler gauge blade with a tapered gauging section on the feeler gauge blade having measuring indicia thereon and a reinforcing section extending along the length of the tapered gauging section to reinforce the feeler gauge blade.

5 Claims, 1 Drawing Sheet

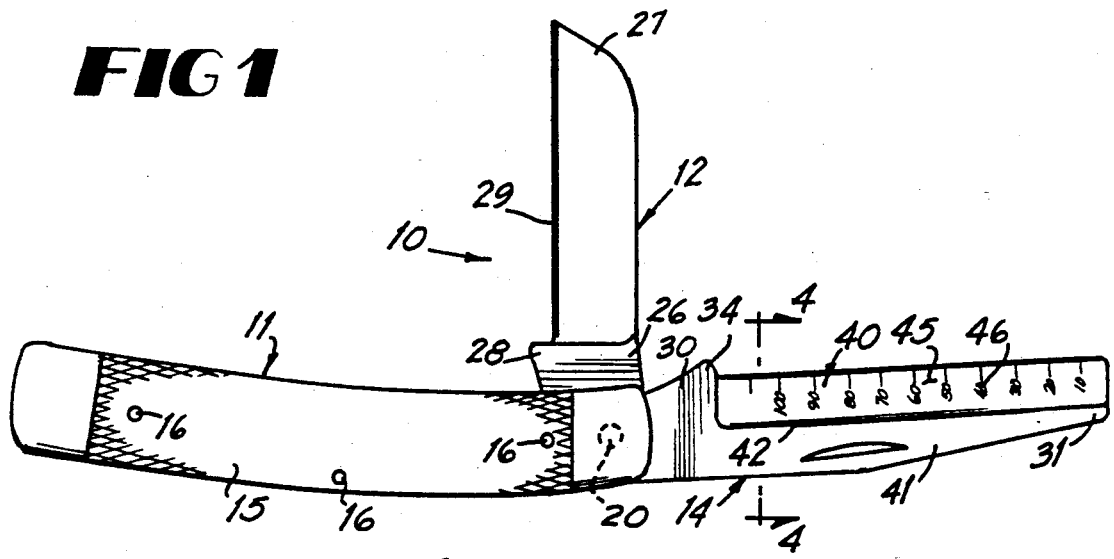
FIG 1
FIG 2
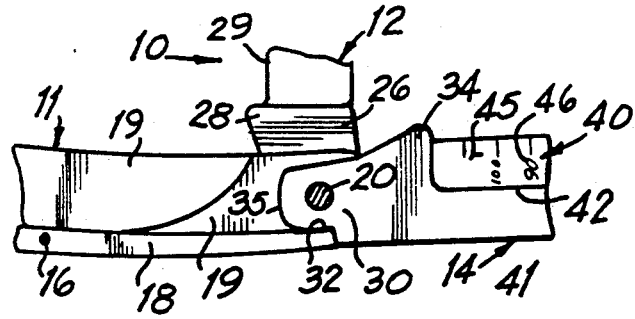
FIG 3
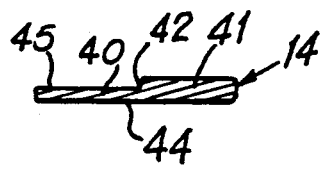
FIG 4

KNIFE TOOL

BACKGROUND OF THE INVENTION

This invention relates generally to tools incorporating a knife and more particularly to tools incorporating a knife and a feeler gauge.

Mechanics have for many years used feeler gauges in automotive repair work. One of the problems with such feeler gauges is that they are small and tend to be frequently misplaced. This is especially true of feeler gauges of the type used to measure spark plug gaps. Moreover, the feeler gauges are difficult to maintain in position during use resulting in inaccurate readings being sometimes obtained.

SUMMARY OF THE INVENTION

These and other problems and disadvantages associated with the prior art are overcome by the invention disclosed herein by providing a tool which incorporates a feeler gauge in a knife handle so the feeler gauge blade is positionable similarly to the knife blade. The feeler gauge blade is pivoted on the pivot pin in the handle and has bearing plates between it and the knife blade so that the blades are pivotal independently of each other. The feeler gauge blade has a tapered gauging section and a reinforcing section that extend along its length to prevent undesirable flexure of the gauging section during use. Indicia is provided along the length of the feeler gauge blade to quantify the tapering thickness of the blade.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 1 is a side view of a tool embodying the invention;

FIG. 2 is a top view thereof;

FIG. 3 is a cross-sectional view taken along line 3—3 in FIG. 2; and,

FIG. 4 is a cross sectional view taken along line 4—4 in FIG. 1.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIG. 1-4, the knife tool 10 includes a handle 11 which pivotally mounts a cutting blade 12 and a feeler gauge blade 14 therein. The cutting blade and feeler gauge blade are pivoted in the handle independently of each other.

The knife handle 11 corresponds to a conventional knife handle with a pair of side pieces 15 connected together by rivets 16. A pair of keeper springs 18 are mounted between the side pieces 15 and held in place at their centers by one of the rivets 16. Bearing plates 19 are positioned between each of the side pieces 15 and the adjacent keeper spring 18 as well as between adjacent keeper springs. Pivot pins 20 join opposite ends of the side pieces 15 and one of the pins 20 pivotally mounts the cutting blade 12 and the feeler blade 14 thereon.

The cutting blade 12 has a conventional knife construction associated with folding pocket knives. It has a keeper receiving cutout in its near end 26 to maintain the blade 12 in its open position and an abutment 28 to arrest the position of the blade 12 in its closed position. The intermediate portion of the near end 26 is constructed to frictionally engage the keeper spring 18 and frictionally hold the blade 12 in positions between the open and closed positions. The cutting edge 29 on the blade 12 extends from the near end to the projecting end 27 thereof.

The feeler gauge blade 14 has a near end 30 and a projecting end 31 with its near end pivoted on the pin 20 with the cutting blade 12. One of the bearing plates 19 is between the near end 30 and the side piece 15 while another bearing plate 19 is between the near end 30 of feeler gauge blade 14 and the near end 26 of the cutting blade 12. This serves to isolate the pivoting movement of the blades from each other.

The near end 30 of feeler gauge blade 14 has a keeper receiving cutout 32 to maintain the blade 14 in its open position and an abutment 34 to arrest the position of the blade 14 in its closed position. The intermediate portion 35 of the near end 30 is constructed to frictionally engage the keeper spring 18 and frictionally hold the blade 14 in positions between the open and closed positions.

The feeler gauge blade 14 includes a tapered gauging section 40 that extends along the length thereof in a side-by-side relationship with a reinforcing section 41 so that the sections 40 and 41 have a common edge 42. Both the tapered gauging section 40 and the reinforcing section 41 extend the full length of the blade 14. The reinforcing section 41 serves to maintain the gauging section 40 in a flat condition so that the effective use of the blade 14 is not hindered. While not required, the sections 40 and 41 define a common back surface 44 but section 40 defines a separate front surface 45. To quantify the thickness of the gauging section 40, appropriate indicia 46 is provided on the front surface 45 thereof. Thus, when the user slips the gauging section 40 of the feeler gauge blade 14 between the points to be measured, the spacing between the points is indicated. The keeper receiving cutout 32 serves to maintain the feeler gauge blade 14 in its open position during use so that the handle 11 can be used to accurately position the feeler gauge blade 14 during use. The intermediate portion 35 of the near end 30 allows the user to position the feeler gauge blade 14 in an intermediate position where access in the fully open position is not practical.

What is claimed as invention is:

1. A knife tool comprising:
   a handle including a pivot pin;
   a cutting blade having a near end and a projecting end, said near end pivotally mounted on said pivot pin in said handle;
   an elongate feeler gauge blade having a near end and a projecting end, said near end pivotally mounted on said pivot pin in a side-by-side relationship with said cutting blade so that said feeler gauge blade is pivotal on said pivot pin independently of said cutting blade, said feeler gauge blade defining a tapered gauging section therein extending along the length thereof decreasing in thickness from said near end to said projecting end and a reinforcing section therein extending along the length thereof and integral with said tapered gauging section to reinforce said feeler gauge blade; and, indicia marking the thickness of said gauging section at spaced apart positions along the length thereof.

2. The knife tool of claim 1 wherein said tapered gauging section and said reinforcing section are located in a side-by-side relationship and define a common edge thereon along which said sections are integral with each other.

3. The knife tool of claim 2 wherein said handle includes a pair of keeper springs, one of said keeper springs being operatively associated with said near end of said cutting blade and the other of said keeper springs being operatively associated with said near end of said feeler gauge blade.

4. The knife tool of claim 3 wherein said feeler gauge blade includes positioning means on said near end thereof operatively engaging the other of said keeper springs to positively maintain said feeler gauge blade in a closed position and an open position in said handle.

5. The knife tool of claim 4 further including bearing spacer means in said handle means positioned between said cutting and feeler gauge blades to permit free independent movement of said blades with respect to each other.

* * * * *